United States Patent
Chen et al.

(10) Patent No.: US 11,514,458 B2
(45) Date of Patent: Nov. 29, 2022

(54) INTELLIGENT AUTOMATION OF SELF SERVICE PRODUCT IDENTIFICATION AND DELIVERY

(71) Applicant: INTERNATIONAL BUSINESS MACHINES CORPORATION, Armonk, NY (US)

(72) Inventors: Bei Chen, Blanchardstown (IE); Adi Botea, Dublin (IE); Elizabeth Daly, Dublin (IE); Oznur Alkan, Clonsilla (IE); Inge Vejsbjerg, Kilmainham (IE); Massimiliano Mattetti, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/601,445

(22) Filed: Oct. 14, 2019

(65) Prior Publication Data
US 2021/0110394 A1    Apr. 15, 2021

(51) Int. Cl.
*G06Q 20/40* (2012.01)
*G06Q 10/06* (2012.01)
*G06Q 20/10* (2012.01)

(52) U.S. Cl.
CPC ..... *G06Q 20/405* (2013.01); *G06Q 10/06316* (2013.01); *G06Q 20/105* (2013.01)

(58) Field of Classification Search
None
See application file for complete search history.

(56) References Cited

U.S. PATENT DOCUMENTS

| | | | |
|---|---|---|---|
| 5,309,355 A | 5/1994 | Lockwood | |
| 6,999,938 B1 | 2/2006 | Libman | |
| 7,340,411 B2 | 3/2008 | Cook | |
| 8,271,355 B2 | 9/2012 | Johnson et al. | |
| 8,363,053 B2 | 1/2013 | Kim | |
| 10,193,842 B1 | 1/2019 | Raju et al. | |
| 2008/0242274 A1* | 10/2008 | Swanburg | G06Q 30/00 455/414.1 |

(Continued)

FOREIGN PATENT DOCUMENTS

WO    2018081833 A1    5/2018

OTHER PUBLICATIONS

ActiveCampaign brings machine learning to SMBs with win probability: Giving teams actionable insights to focus their efforts on the right deals. (May 17, 2018). PR Newswire Retrieved from https://dialog.proquest.com/professional/docview/2039827015?accountid=131444 on Jul. 14, 2022 (Year: 2018).*

(Continued)

*Primary Examiner* — Kito R Robinson
(74) *Attorney, Agent, or Firm* — Griffiths & Seaton PLLC

(57) ABSTRACT

Embodiments for implementing intelligent automation of opportunity transaction workflows by a processor. One or more tasks identified in an existing transaction opportunity workflow suitable for automation may be automated in a current transaction opportunity workflow. The automated tasks may be scheduled and executed in the current transaction opportunity workflow. The automated tasks in the current transaction opportunity workflow may be monitored.

15 Claims, 8 Drawing Sheets

(56) References Cited

U.S. PATENT DOCUMENTS

| | | |
|---|---|---|
| 2013/0185191 A1* | 7/2013 | Ganor .................... G06Q 40/02 |
| | | 705/39 |
| 2014/0067484 A1 | 3/2014 | Richter |
| 2015/0170086 A1* | 6/2015 | Byron ............. G06Q 10/06316 |
| | | 705/7.26 |
| 2017/0076246 A1* | 3/2017 | Volkov ........... G06Q 10/063116 |
| 2018/0047076 A1 | 2/2018 | Fekete |
| 2018/0204226 A1 | 7/2018 | Balasubramanian et al. |
| 2019/0042887 A1* | 2/2019 | Nguyen ................. G06N 20/00 |
| 2020/0027050 A1* | 1/2020 | Ghosh ................ G06Q 10/0631 |
| 2020/0073639 A1* | 3/2020 | Prasad ................... G06N 20/00 |
| 2020/0272978 A1* | 8/2020 | Flores .................... G06F 17/18 |

OTHER PUBLICATIONS

Domo introduces the domo business automation engine, the first-of-its-kind orchestration layer across all data, systems and people in an organization: Taps the power of the domo platform and machine learning to close the gap from insights to action. (Mar. 20, 2019). NASDAQ OMX's News Release Distribution Channel Retrieved from https://dialog.proquest.com/professional/docview/2194185433?accountid=131444 on Jul. 14, 2022 (Year: 2019).*

"Automated Interactive Sales Processes". Tomas Klos, Koye Somefun, Han La Poutre. IEEE Intelligent Systems. 26 (4): 54-61, 2010.

* cited by examiner

US 11,514,458 B2

1

INTELLIGENT AUTOMATION OF SELF SERVICE PRODUCT IDENTIFICATION AND DELIVERY

BACKGROUND OF THE INVENTION

Field of the Invention

The present invention relates in general to computing systems, and more particularly to, various embodiments for implementing intelligent automation of opportunity transaction workflows by a processor.

Description of the Related Art

In today's interconnected and complex society, computers and computer-driven equipment are more commonplace. Processing devices, with the advent and further miniaturization of integrated circuits, have made it possible to be integrated into a wide variety of devices. Due to the recent advancement of information technology and the growing popularity of the Internet, a vast amount of information is now available in digital form. Such availability of information or data has provided many opportunities. As the technology field grows exponentially each year and ever-growing amounts of data are stored, retrieved, and accessed on computing systems, the need to deliver accurate and applicable data becomes increasingly paramount.

SUMMARY OF THE INVENTION

Various embodiments for implementing intelligent automation of self-service product identification and delivery by a processor, are provided. In one embodiment, by way of example only, a method for implementing intelligent automation of opportunity transaction workflows, by a processor, is provided. One or more tasks identified in an existing transaction opportunity workflow suitable for automation may be automated in a current transaction opportunity workflow. The automated tasks may be scheduled and executed in the current transaction opportunity workflow. The automated tasks in the current transaction opportunity workflow may be monitored.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
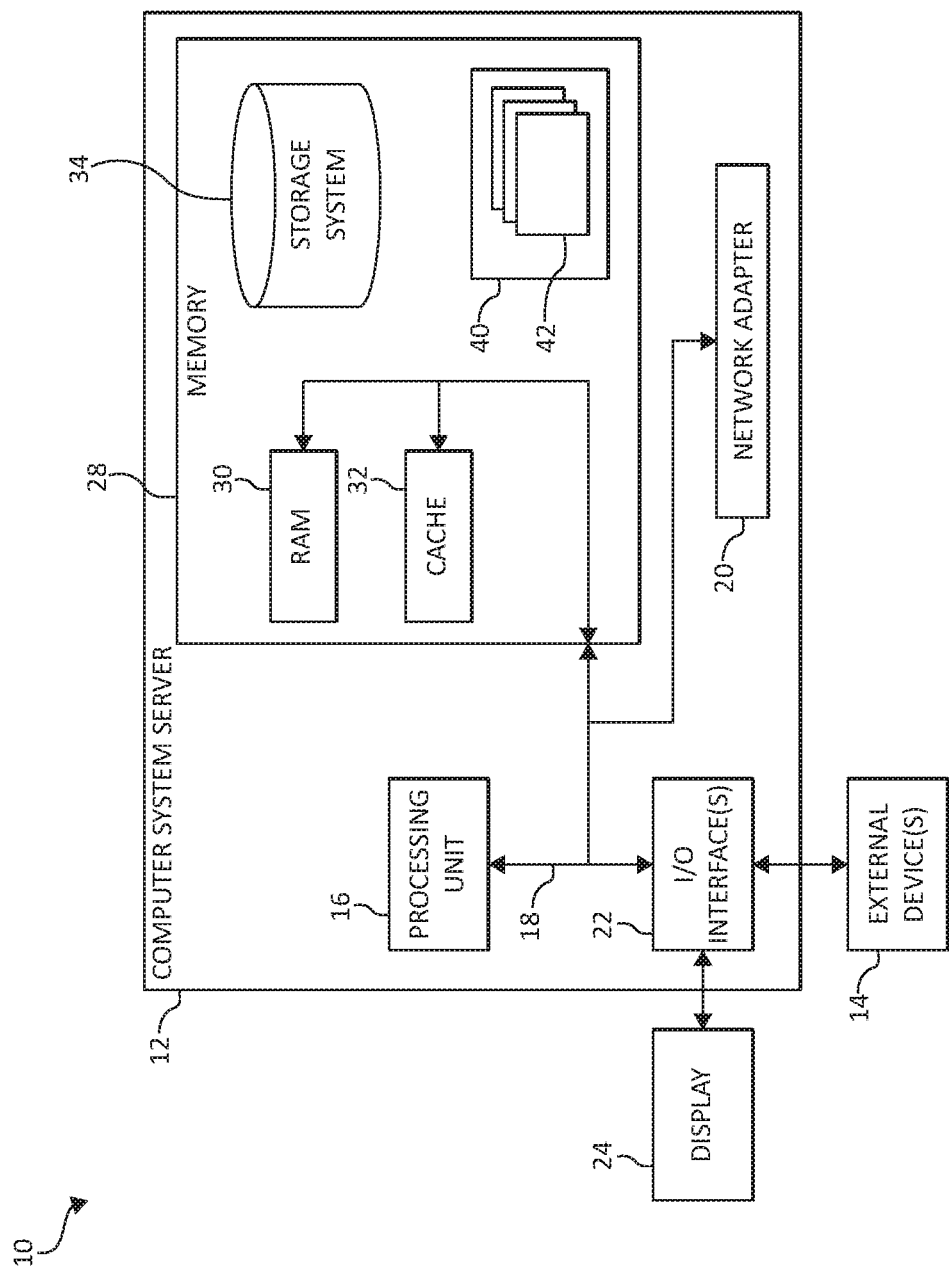
FIG. 1 is a block diagram depicting an exemplary computing node according to an embodiment of the present invention.

The advancement of computing storage and computational power provide the ability to collect large amounts of data, particularly for various types of data relating to businesses, organizations, or governments. Moreover, as the amount of electronic information continues to increase, the demand for sophisticated information access systems also grows. Digital or "online" data has become increasingly accessible through real-time, global computer networks. Many data-intensive applications require the extraction of information from data sources, such as, for example, within a business environment.

More specifically, improving productivity, effectiveness, and opportunities of a business, organization, or government entity can be an effective operational strategy to drive revenue growth and manage bottom-line expenses. In one aspect, an entity or "enterprise entity" includes, but is not limited to: a private organization (e.g., bank, private company, etc.), a public organization (e.g., public school, government, police/fire department, post office, etc.), non-profit organization, a person, a product, etc. In an additional aspect, an entity may be a client of another entity (e.g., a person is a client of a business or a certain business is a client of another type of business, etc.). Sales productivity, effectiveness, and opportunity are among critical issues for most companies, especially those with a sales force and client-oriented organizations (e.g., consulting companies, insurance companies, software and hardware manufacturers, etc.).

Entities generally find it difficult to discover and acquire new clients and opportunities (e.g., sales opportunity/projects). Currently, decisions at various stages of a sales pipeline are manually made by individual sellers or by managers who make centralized decisions. This suffers from many drawbacks such as, for example, delayed decision times in responding to immediate needs of a client/potential customer ranging from loss of positive customer feedback or trust and even lost or stale opportunities. Additionally, many communications between sellers and clients/potential customers are highly repetitive such as, for example, a client inquiry pertaining to a specific goods or service (e.g., "product"). As such, a seller is required to respond to the inquiry such as, for example, responding to the client by sending a white paper with pricing. However, in many instances, due to the nature of manual responses from the seller to the client/potential customer there is an increased risk for human error while simultaneously increasing the cost with reduced effectiveness by failing to provide an automated, streamlined data response procedures. Thus, success and efficiency for securing (e.g., "winning") an opportunity often depends on the ability to automate communication channels within an entity such as, for example, a sales team.

Therefore, the various aspects of the present invention, among other things, provide an intelligent system for self-service product identification and delivery (e.g., automatic product identification and delivery). In one aspect, the intelligent system may provide automation of opportunity transaction workflows. One or more tasks identified in an existing transaction opportunity workflow suitable for automation may be automated in a current transaction opportunity workflow. The automated tasks may be scheduled and executed in the current transaction opportunity workflow. The automated tasks in the current transaction opportunity workflow may be monitored.

In one aspect, for example, following the conclusion of a defined time period (e.g., at the end of each month or quarter), the intelligent system flags one or more transaction opportunity services (e.g., products) or tasks (e.g., sending an email) as candidates for automation. During a training stage, a machine learning model and/or domain expert (e.g., a sales manager/administrator) may evaluate and test various interactions of the automated or more transaction opportunity services and/or tasks to determine if a recipient (e.g., a client/potential customer) is satisfied with the quality of one or more automated transaction opportunity services, tasks, and/or related responses.

Upon the machine learning model and/or domain expert providing a score or indication a level of satisfaction to one or more of the automated transaction opportunity services, tasks, and/or related responses, the intelligent system for providing the automated transaction opportunity services, tasks, and/or related responses is scheduled for execution to receive, process, and respond to all inquiries associated with the transaction opportunity services, tasks, and/or related responses. The intelligent system may also monitor each transaction opportunity result (e.g., contracts signed for a sale or lost sale) for a defined period of time (e.g., a month) and if there are one or more anomalies identified (e.g., sales transactions performance drops below a defined threshold), the machine learning model and/or domain expert (e.g., a sales manager/administrator) may be notified for review, retesting, re-evaluation, and/or re-configuration of the historical interactions and can remove the automation until the issues are resolved relating to the automation of opportunity transaction workflows.

In one aspect, data may be collected from a knowledge database (e.g., historical data) relating to a plurality of entities/entity partners extracted from one or more data sources, previous and/or current transactions (e.g., sales quotes, contracts, discounts/offers, service agreements), communication messages (e.g., chat logs, emails, marketing data/materials, text messages, voice mails, recorded media (e.g., conference or webinars)), business processes or workflows/procedures, and/or other historical data related to previous automated procedures. In one aspect, data from one or more data sources may be identified and/or processed using natural language processing (NLP) operations. A graphical user interface (GUI) (e.g., an interactive GUI) of a computing device may be used for implementing the intelligent automation of opportunity transaction workflows.

In one aspect, an opportunity (e.g., a business opportunity) may be a "transactional operation" such as a sales opportunity or vendor-client relationship. An opportunity may also be where unmet and unarticulated needs are uncovered to create innovation opportunities. An opportunity may also include new or upgraded products and services that may be sold or products or services that do not exist. The opportunities may be identified for one or more entities of existing businesses, entities searching for increased growth opportunities, or entities wanting to explore strategic diversification. Thus, a client or "opportunity entity" may be an identified client or entity with whom a business opportunity may be available and any new openings or opportunities untouched by competitors, or it can be considered part of a remote and/or different industry or outside the boundaries of the firm. An opportunity may also include outcome(s) of customer-entity inquiries and a discovery process, that leads to new profit growth opportunities by defining potential gaps in existing markets. The opportunity may be an identified and/or entirely new market, or it can be used to map incremental innovation in products or service and/or a new source of customer value that can be translated to economic value.

It should be noted as described herein, the term "intelligent" (or "intelligence") may be relating to, being, or involving conscious intellectual activity such as, for example, thinking, reasoning, or remembering, that may be performed using machine learning. In an additional aspect, intelligent or "intelligence" may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, intelligent or "intelligence" may refer to a mental action or process of acquiring knowledge and understanding through thought, experience, and one or more senses using machine learning (which may include using sensor based devices or other computing systems that include audio or video devices). Intelligent or "intelligence" may also refer to identifying patterns of behavior, leading to a "learning" of one or more events, operations, or processes. Thus, an intelligent model may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term cognitive may refer to an intelligent system. The intelligent system may be a specialized computer system, or set of computer systems, configured with hardware and/or software logic (in combination with hardware logic upon which the software executes) to emulate human intelligent/cognitive functions. These cognitive systems apply human-like characteristics to conveying and manipulating ideas which, when combined with the inherent strengths of digital computing, can solve problems with a high degree of accuracy (e.g., within a defined percentage range or above an accuracy threshold), speed and resilience on a large scale. An intelligent system may perform one or more computer-implemented cognitive operations that approximate a human thought process while enabling a user or a computing system to interact in a more natural manner. An intelligent system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the intelligent/cognitive operation(s), examples of which include, but are not limited to, question answering, identifying problems, identification of related concepts within different portions of content in a corpus, and intelligent search algorithms, such as Internet web page searches.

In general, such intelligent systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Thus, the present invention may provide cognitive recommendations, according to user data analysis problems, that may retrieve and mine data sources (e.g., documents, web pages, websites, online journals, conference materials, scientific papers, etc.). One or more relevant methods and features associated with the methodology may be extracted from the mined data sources. In short, the system 1) retrieves one or more articles, 2) extracts one or more methods, and/or extracts one or more features associated with the extracted methods, and/or 3) collects various types of user feedback.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer may be able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
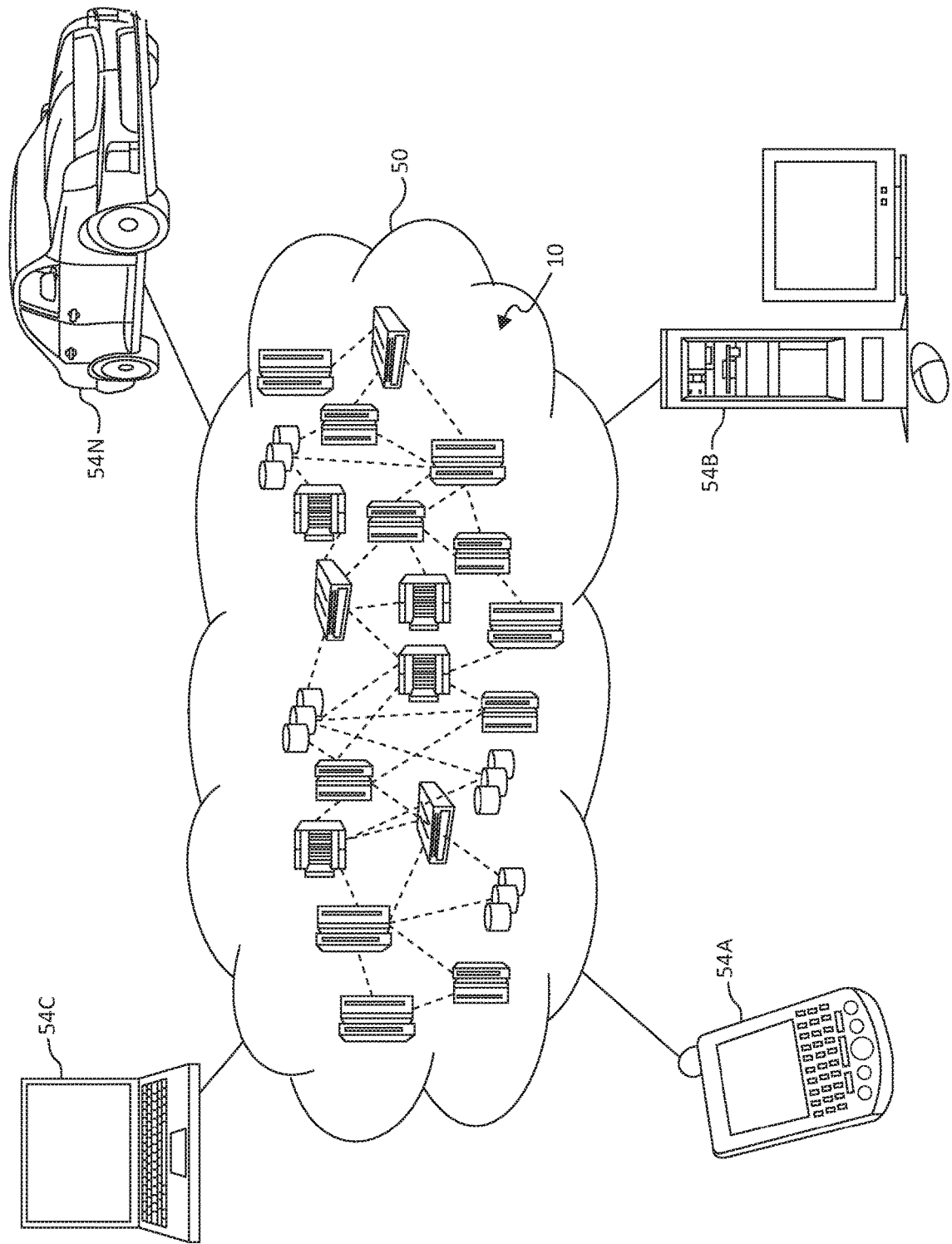
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
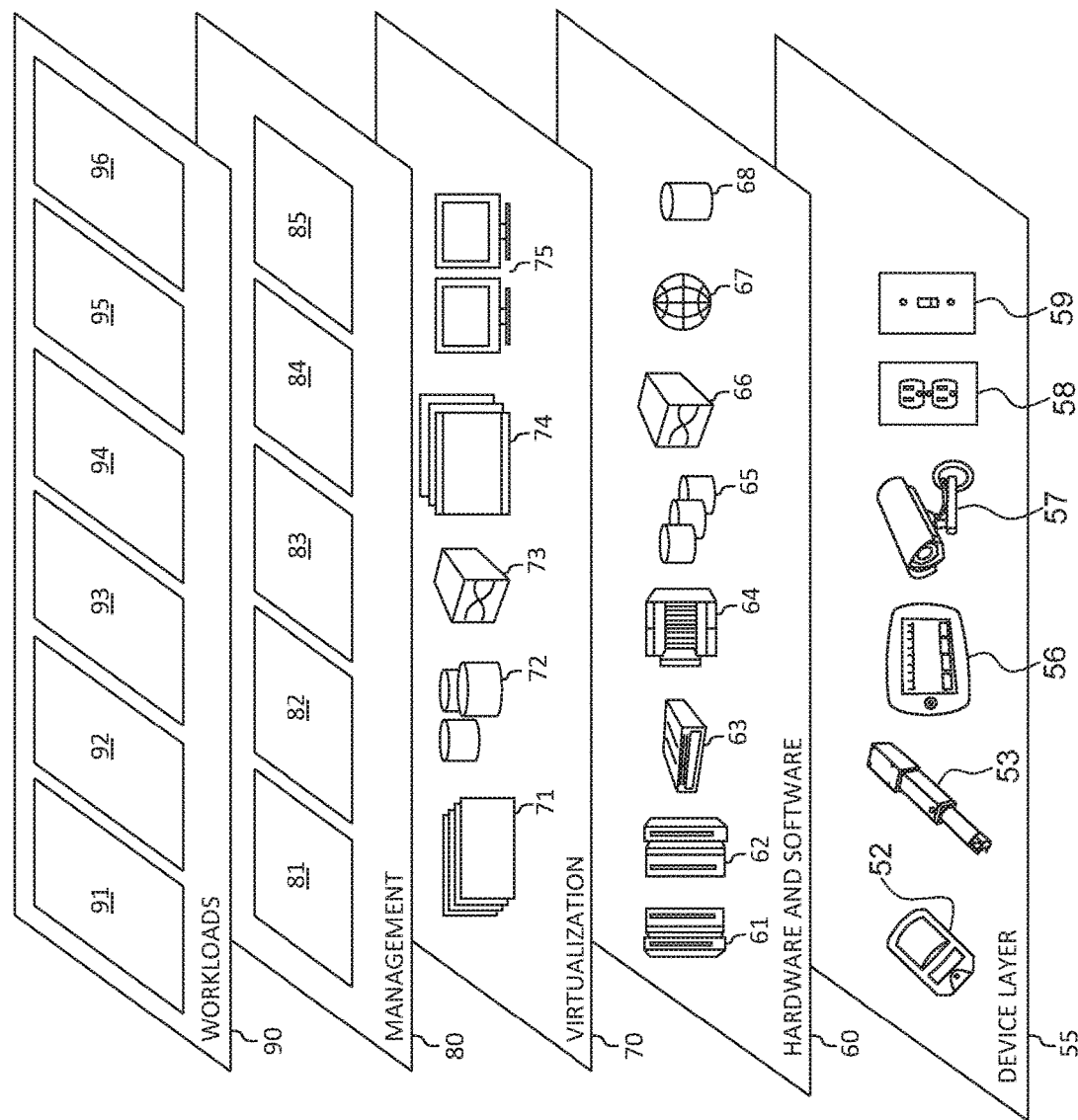
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities (including sensors and actuators) collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, process controller systems and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent automation of opportunity transaction workflows. In addition, workloads and functions 96 for intelligent automation of opportunity transaction workflows may include such operations as data analysis (including data collection and processing from various environmental sensors), and predictive data analytics functions. One of ordinary skill in the art will appreciate that the workloads and functions 96 for intelligent opportunity recommendation and management may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

Figure 4:
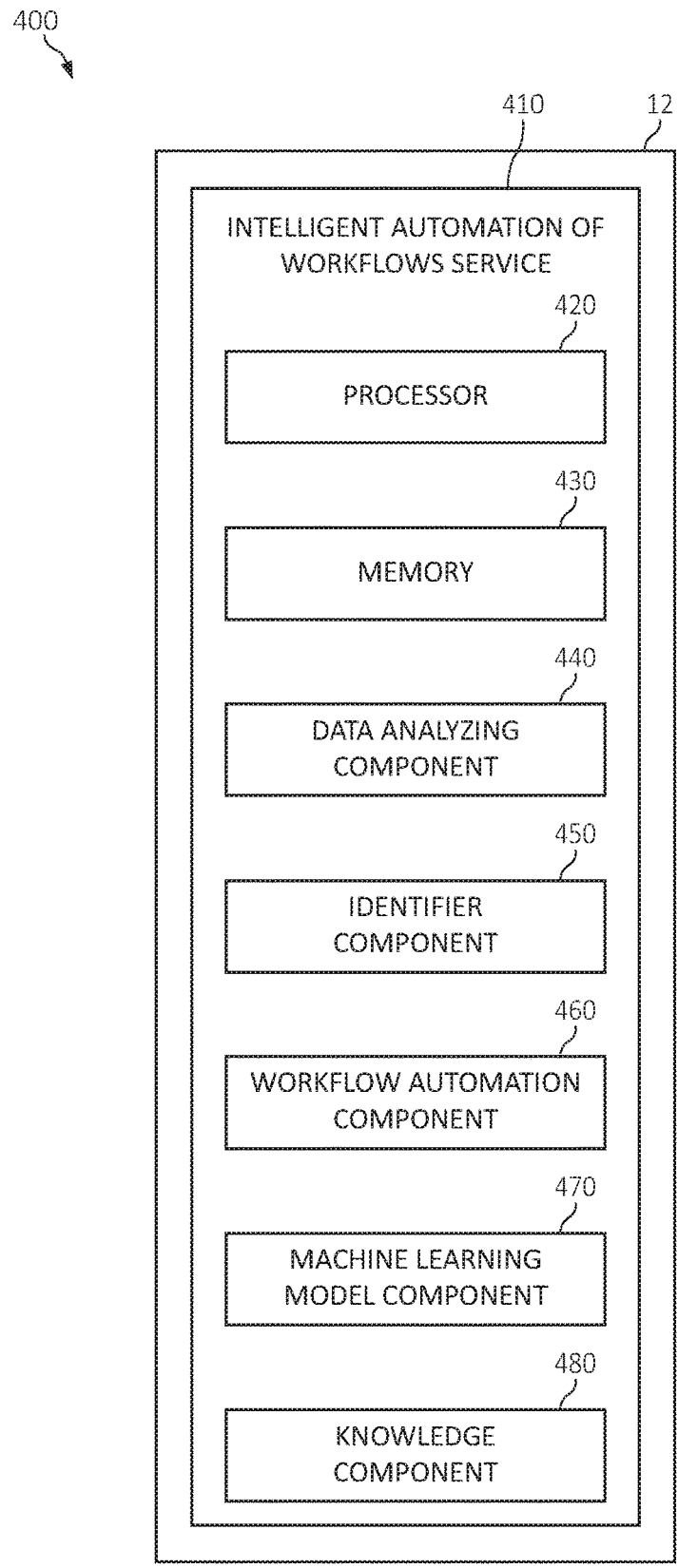
FIG. 4 is a diagram depicting various user hardware and computing components functioning in accordance with aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. Repetitive description of like elements, components, modules, services, applications, and/or functions employed in other embodiments described herein is omitted for sake of brevity.

An intelligent automation of workflows service 410 is shown, incorporating processing unit ("processor") 420 to perform various computational, data processing and other functionality in accordance with various aspects of the present invention. The intelligent automation of workflows service 410 may be provided by the computer system/server 12 of FIG. 1. The processing unit 420 may be in communication with memory 430. The intelligent automation of workflows service 410 may include a data analyzing component 440, an identifier component 450 (e.g., an identification component 450), a workflow automation component 460, a machine learning component 470, and a knowledge component 480.

As one of ordinary skill in the art will appreciate, the depiction of the various functional units in intelligent automation of workflows service 410 is for purposes of illustration, as the functional units may be located within the intelligent automation of workflows service 410 or elsewhere within and/or between distributed computing components.

The data analyzing component 440 may receive data (e.g., communication data relating to one communications relating to transaction (e.g., "sales" opportunity) and analyze the data relating to both product information and historical transaction (e.g., sales) opportunity data relating to one or more transaction opportunities for identifying the plurality of tasks.

In an additional aspect, the data analyzing component 440 may analyze and identify structured and/or unstructured data such as, for example, a plurality of communications (e.g., words, clauses, phrases, sentences, statements, messages, etc.) from one or more data sources. The data sources may be provided as a corpus or group of data sources defined and/or identified. The data sources may include, but are not limited to, data sources relating to one or more documents, materials related to emails, books, scientific papers, online journals, journals, articles, drafts, audio data, video data, and/or other various documents or data sources capable of being published, displayed, interpreted, transcribed, or reduced to text data. The data sources may be all of the same type, for example, pages or articles in a wiki or pages of a blog. Alternatively, the data sources may be of different types, such as word documents, wikis, web pages, power points, printable document format, or any document capable of being analyzed by a natural language processing system.

In addition to text based documents, other data sources such as audio, video or image sources may also be used. The audio, video or image sources may be pre-analyzed to extract or transcribe their content for natural language processing (via the machine learning component 470, such as converting from audio to text and/or image analysis). For example, a voice command issued by a content contributor may be detected by a voice-activated detection device 404 and record each voice command or communication. The recorded voice command/communication may then be transcribed into text data for natural language processing ("NLP") and artificial intelligence (AI) to provide processed content.

The data sources may be analyzed by the data analyzing component 440 and the identifier component 450 to data mine or transcribe relevant information from the content of the data sources (e.g., documents, emails, reports, notes, audio records, video recordings, live-streaming communications, etc.) in order to display the information in a more usable manner and/or provide the information in a more searchable manner.

The data analyzing component 440, in association with the machine learning component 470 and the knowledge component 480, may learn and classify those of the plurality of tasks capable of being automated for the current transaction opportunity workflow related to an identified transaction opportunity.

In one aspect, the knowledge component 480 may classify those of the plurality of tasks. The knowledge component 480 (and in association with the machine learning component 470) may perform an NLP operation on the those of the plurality of tasks to identify tasks capable of being automated. The knowledge component 480 may collect, store, and/or maintain historical data relating to opportunity transactions.

The workflow automation component 460 may automate in a current transaction opportunity workflow those of a plurality of tasks identified in an existing transaction opportunity workflow suitable for automation. The workflow automation component 460 may also function a monitoring component to monitor the plurality of tasks automated in the current transaction opportunity workflow. The workflow automation component 460 may automatically replicating those of the plurality of tasks in the current transaction opportunity workflow.

The workflow automation component 460 may schedule and execute those of the plurality of tasks automated in the current transaction opportunity workflow. The workflow automation component 460 may test and evaluate the execution of those of the plurality of tasks automated in the current transaction opportunity workflow. An interactive graphical user interface ("GUI") enables a user to assist with the testing and evaluating.

The identifier component 450, in association with the workflow automation component 460, may, for self-service identification, identify one or more anomalies during execution of the plurality of tasks automated in the current transaction opportunity workflow and trigger a notification upon identification of the one or more anomalies.

The machine learning component 470 may initiate a machine learning mechanism to train, evaluate, and test an automation model for automating opportunity transaction workflows while also learning those of the plurality of tasks capable of being automated for the current transaction opportunity workflow related to an identified transaction opportunity. By way of example only, the machine learning component 470 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure. The machine learning operations may include various AI instances. These AI instances may include IBM® Watson® Alchemy Language. (IBM Watson and Alchemy are trademarks of International Business Machines Corporation).

Figure 5:
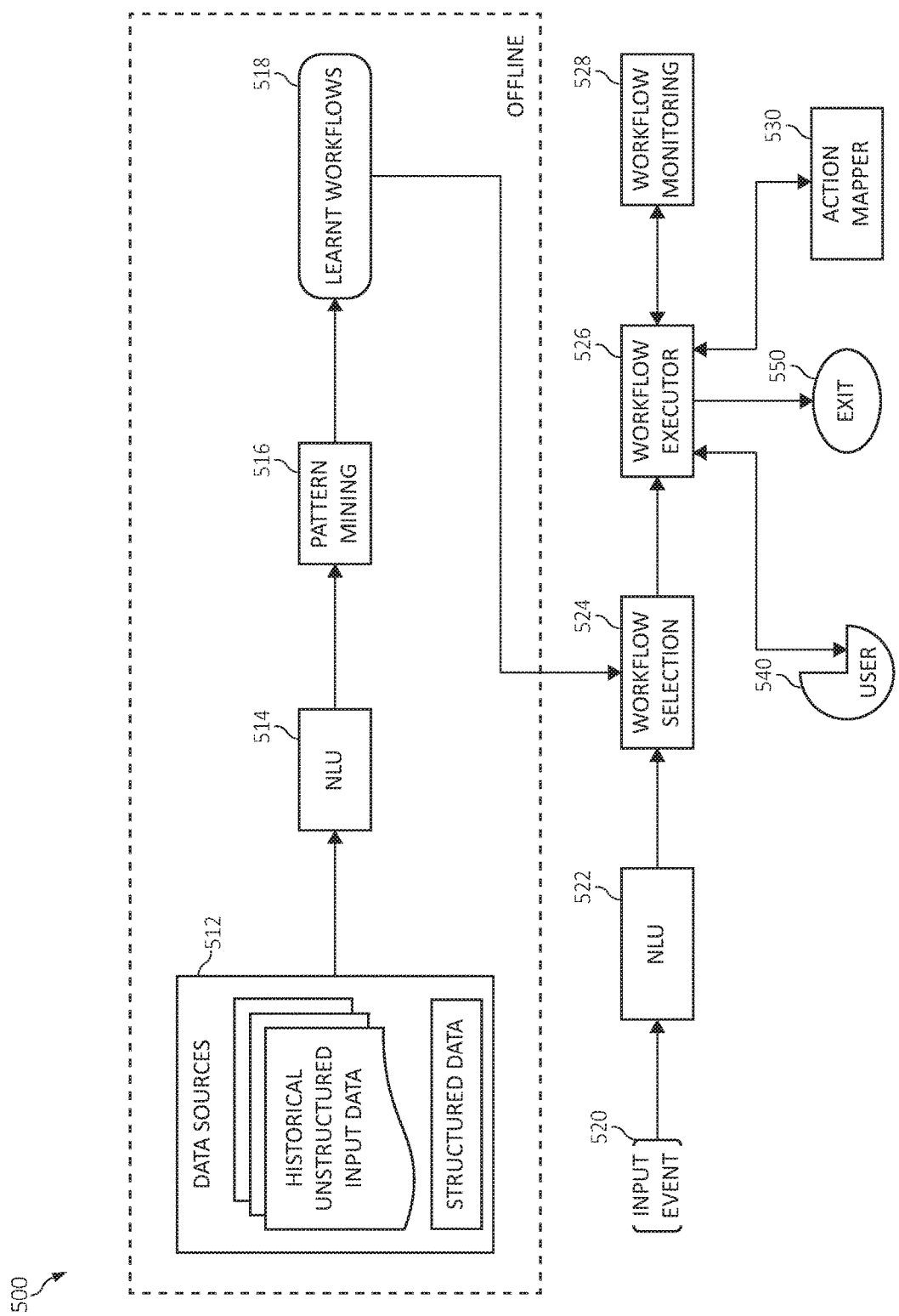
FIG. 5 is an additional block diagram depicting an exemplary functional relationship for intelligent automation of opportunity transaction workflows accordance with aspects of the present invention.

Turning now to FIG. 5, block/flow diagram 500 is depicting for intelligent automation of opportunity transaction workflows. In one aspect, one or more of the components, modules, services, applications, and/or functions described in FIGS. 1-4 may be used in FIG. 5. For example, computer system/server 12 of FIG. 1, incorporating processing unit 16, may be used to perform various computational, data processing and other functionality described in FIG. 5. Also, the intelligent automation of workflows service 410 may be implemented and used to illustrate the functionality and/or operations depicted in FIG. 5. Repetitive description of like elements, components, modules, services, applications, and/or functions employed in other embodiments described herein is omitted for sake of brevity.

As a preliminary matter, during an "offline" time period/event (e.g., occurring offline in the intelligent automation of workflows service 410 of FIG. 4), one or more data sources 512 may be accessed to retrieve various types of data such as, for example, unstructured data (e.g., historical unstructured input data) and/or structured data. In block 514, an NLU operation may be executed on the one or more data sources 512 for identify those of the plurality of tasks to identify tasks capable of being automated (e.g., transcribing data into text data for natural language processing ("NLP") and artificial intelligence (AI) to provide processed content). In block 516, one or more patterns may be identified using a pattern mining operations such as, for example, extracting sequence patterns.

From block 516, one or more workflows may be learned, as in block 518. In one aspect, for learning the workflows, one or more discrete steps/operations in an opportunity transaction process workflow (e.g., a sales process workflow) may be extracted from the input data received from blocks 512, 514, and/or 516. In one aspect, this input data may include, but not limited to, a timestamp of any possible interaction and steps, tasks, events, and/or operations in various backgrounds (e.g., searching for a contact, reading information relating to the client, etc.).

Also, the workflows may be learned using the pattern mining operation (of block 516) to extract sequence patterns (e.g., populate a mapping (e.g., action mapper of block 530) with a set of steps/operation that match to executable actions.

A classification operation may be performed to determine/decide if each step, task, event, and/or operation is capable of being automated (e.g., automatable). The operations for learning the workflow may also include identifying one or more trigger events associated with automatable process workflow. Intents that map to a given action may be collected. In one aspect, one or more process workflows may then be executed when a trigger event is received. For example, a trigger event may be receiving a query about a particular product and the automated response action may be 1) requesting a quote from an internal service associated with the entity providing the particular product and/or 2) sending an automated response email with the received quote and any and all product documentation.

It should be noted that determining/deciding if each step, task, event, and/or operation is capable of being automated (e.g., automatable) is based on one or more features. The features may include predictability (e.g., based on the amount of supporting evidence in the data, any identified and observed patterns in the data). The classification operation may include assigning/providing a confidence score/value based on the input entities and intents, and also a frequently by which a generated response by a domain expert map to a learned response). The features may include a task complexity (e.g., a degree of complexity indicating a level that the task is capable of being performed automatically using a computing system and/or machine learning operation/AI system). The features may include a relationship between task execution and a transaction opportunity success.

Turning now to block 520, an input event may be received. Again, an NLU operation may be performed to determine, learn, and/or understand the input event, as in block 522. In block 524, one or more learned workflows may be selected (from the learned workflows described in block 518).

In block 526, a workflow may be executed via a workflow executor component such as, for example executing those of the plurality of tasks automated in the current transaction opportunity workflow. The operations for executing the workflow (e.g., a current transaction opportunity workflow) may include extracting one or more relevant entities and intents. A state of the process may be learned, determined, and/or identified where the state is composed of a set of variable values. One or more variables available at a given point in the process may be instantiated (e.g., variables indicate whether a given document is available, a given email has been sent, a reply has been received, a given reply is positive and negative, the path of a given document). In one aspect, each automated action (e.g., step, task, event, operation, process, etc.) may be executing in one or more selected operations for implementation such as, for example, a particular operation used to implement the action (e.g., for a "send-email" action and/or there may be a computing code/trigger that sends the email) and the actions may have one or more parameters for execution (e.g. "send-email proposal in document A"). Also, the workflow execution may include performing an action that changes the state of the process (e.g., set "send-email proposal in document A" as "true").

In block 528, a workflow may be monitored. In one aspect, when seen as input to monitoring, the automated actions (steps) may be annotated with one or more constraints such as, for example: 1) a duration/deadline constraints, 2) features to be present (e.g., document A sent, positive reply received) and implemented based on variables used for a process state definition (e.g., information that defines a process and describes a current process state).

The monitoring may include identifying one or more anomalies (e.g., violations of conditions, policies, rules, and/or procedures) that may trigger one or more alarms/notifications. In one aspect, these constraints may be learned via machine learning and/or user/administrator 540 defined (e.g., identified a decrease in win probability of transaction operation contract/sales, and/or decrease in in client follow up, etc.). The machine learning and/or user/administrator 540 can then examine the actions taken by the system to determine whether these changes are a result of the system handling requests incorrectly.

Figure 6:
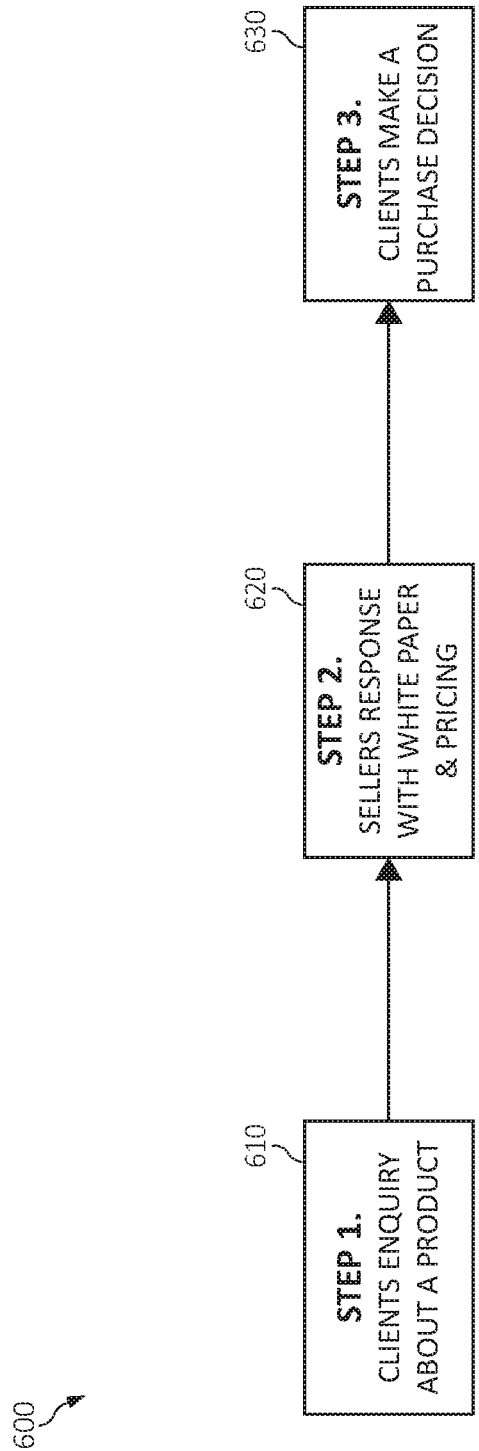
FIG. 6 is an additional block diagram depicting an exemplary functional relationship for intelligent automation of opportunity transaction workflows accordance with aspects of the present invention.
Figure 7:
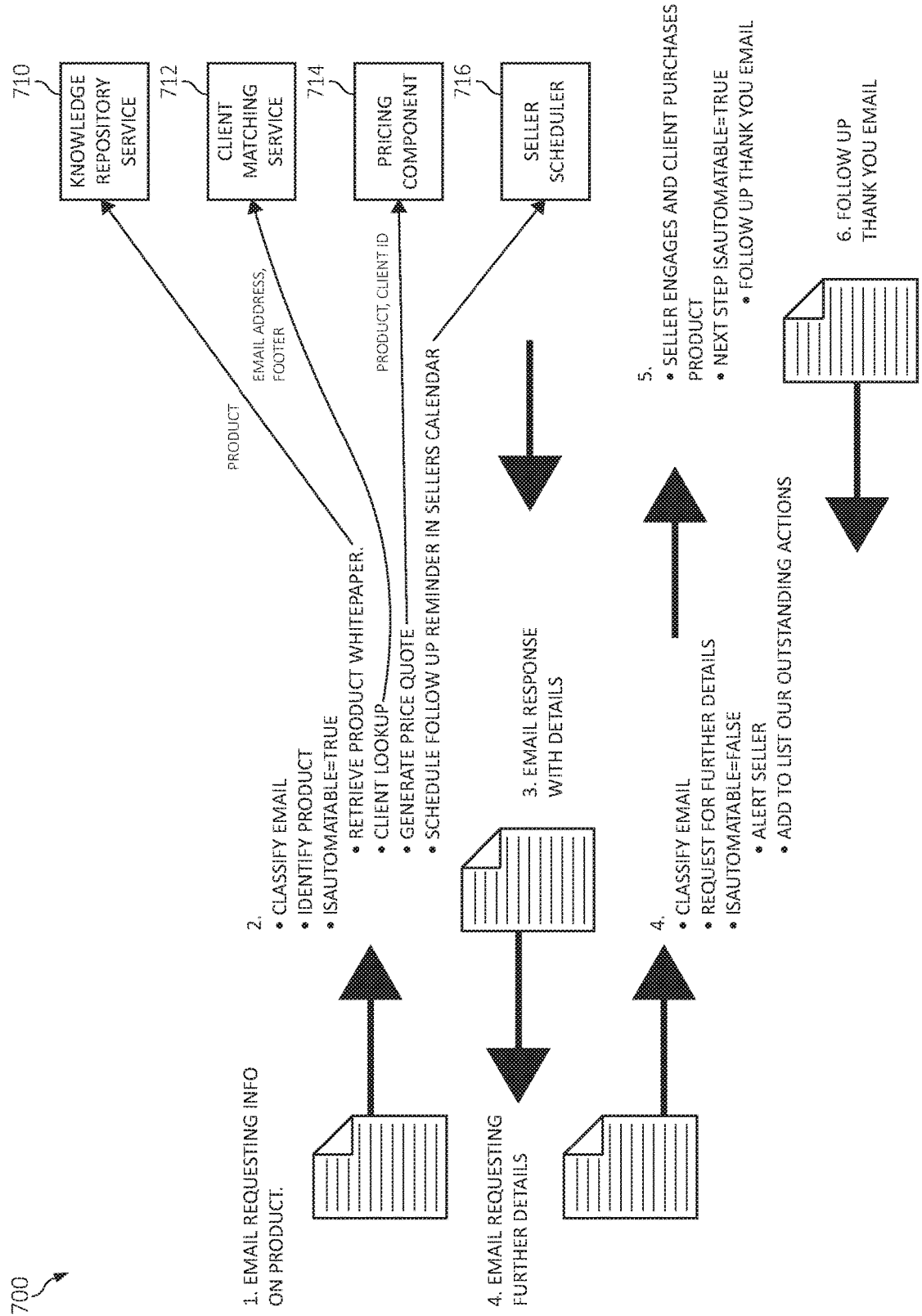
FIG. 7 is an additional block diagram depicting an exemplary operations for intelligent automation of opportunity transaction workflows accordance with aspects of the present invention.

In view of the forgoing operations of FIGS. 4-5, consider the following exemplary operations for intelligent automation of opportunity transaction workflows in FIGS. 6 and 7. Repetitive description of like elements, components, modules, services, applications, and/or functions employed in other embodiments described herein is omitted for sake of brevity.

Referring now to FIG. 6, an operational flow diagram illustrating implantation of the intelligent automation of workflows service 410.

In step 1, a potential client may send an enquiry relating to a particular product, as in block 610. In step 2, the operations described in FIGS. 4 and 5 may be implemented via intelligent automation of workflows service 410 for providing automation of one or more opportunity transaction workflows (e.g., automatically provide, by a seller/to a customer a proposal and selected information such as, for example, pricing and a white paper), as in block 620. For example, the intelligent automation of workflows service 410 may secure a quote, write a proposal, and send an email that includes the quote and proposal in document "A." In step 3, the client is enabled to make a purchase decision (e.g., decision to enter a contract for a transaction opportunity), as in block 630.

Referring now to FIG. 7, an additional operational flow diagram is illustrated using the intelligent automation of workflows service 410 of FIGS. 4 and/or 5.

In step 1, an email is received (from a client) requesting information on a particular transaction item (e.g., a product). In step 2, the email is classified, the transaction item (e.g., the product) is identified, and determination operation is performed to determine that one or more actions related to the requests for information on the particular transaction item (e.g., the product) is capable of being automated. For example, the automated actions may include the following. A knowledge repository service 710 is accessed and/or utilized to retrieve a product white paper. A client matching service 712 may be accessed and/or utilized to learn and/or access data (e.g., lookup operation) relating to the client. A pricing component 714 may be accessed and/or utilized to generate a transaction opportunity fee (e.g., price quote). A scheduler 716 (e.g., a seller's scheduler) may be accessed and/or utilized to schedule a follow up reminder in the seller's calendar.

In step 3, an email response may be sent/provided back to the client (e.g., from the seller) with all of the information automatically performed in the automated workflow of step 2.

In step 4, the email may be classified and include information requesting further details (e.g., details relating to the initially received query). However, since the requesting of information requires action by the client (e.g., breaks the automation workflow capable of being provided by the intelligent automation of workflows service 410 of FIG. 4), one or more anomalies are detected (and the automation state of the workflow may be set to "false"). The seller is alerted to the anomaly and is added to a list of outstanding actions that required additional follow up, attention, and/or further actions.

In step 5, the client engages communication with the seller and the transaction opportunity is secured (e.g., the client purchases the product). Again, at this point the automation workflow may be re-executed (e.g., triggered for execution) (e.g., the automation state of the workflow may be set to "true"), and one or more additional automated sub-actions associated with the workflow may be performed such as, for example, sending a follow up action email thanking the client, as in step 6.

Figure 8:
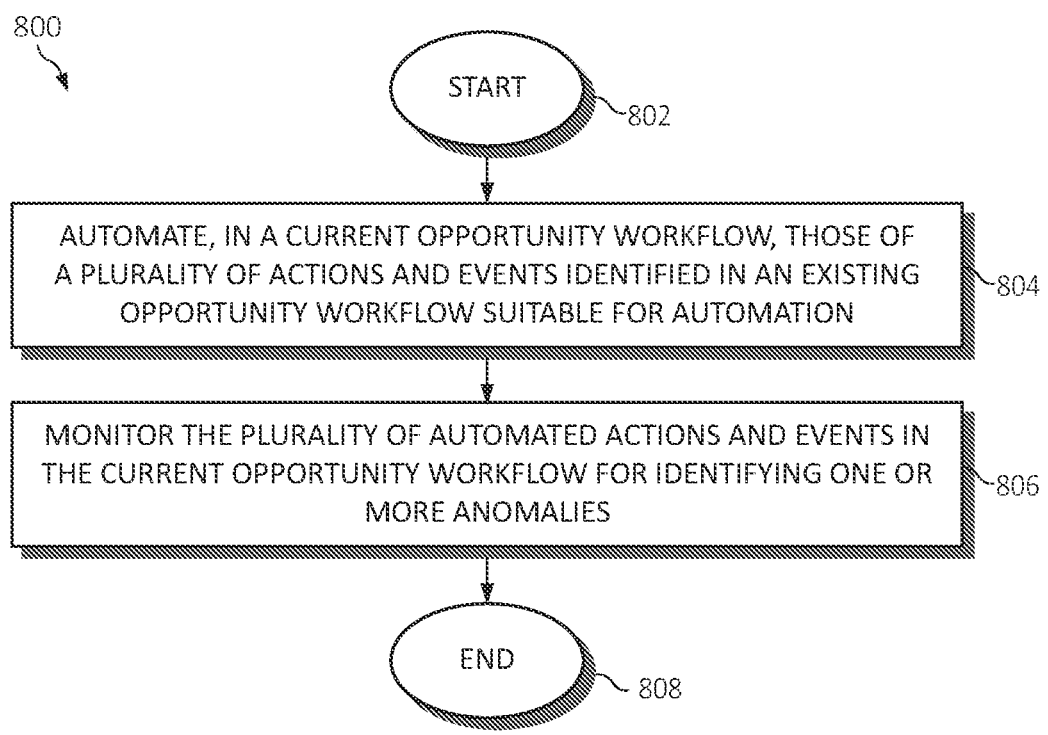
FIG. 8 is a flowchart diagram of an exemplary method implementing intelligent automation of opportunity transaction workflows by a processor, in which various aspects of the illustrated embodiments may be implemented.

FIG. 8 is a flowchart diagram of an exemplary method for intelligent opportunity recommendation and management by a processor, in which various aspects of the illustrated embodiments may be implemented. The functionality 800 may be implemented as a method executed as instructions on a machine, where the instructions are included on at least one computer readable storage medium or one non-transitory machine-readable storage medium. The functionality 800 may start in block 802.

One or more tasks identified in an existing transaction opportunity workflow suitable for automation may be automated in a current transaction opportunity workflow, as in block 804. The automated tasks may be scheduled and executed in the current transaction opportunity workflow, as in block 806. The automated tasks in the current transaction opportunity workflow may be monitored, as in block 808. The functionality 800 may end in block 810.

In one aspect, in conjunction with and/or as part of at least one block of FIG. 8, the operations of 800 may include each of the following. The operations of 800 may analyze data relating to both product information and historical transaction opportunity data relating to one or more transaction opportunities for identifying the plurality of tasks.

The operations of 800 may learn and classify those of the plurality of tasks capable of being automated for the current transaction opportunity workflow related to an identified transaction opportunity, and/or automatically replicating those of the plurality of tasks in the current transaction opportunity workflow. The operations of 800 may schedule and execute those of the plurality of tasks automated in the current transaction opportunity workflow.

The operations of 800 may identify one or more anomalies during execution of the plurality of tasks automated in the current transaction opportunity workflow, and/or trigger a notification upon identification of the one or more anomalies. The operations of 800 may test and evaluate the execution of those of the plurality of tasks automated in the current transaction opportunity workflow, wherein an interactive graphical user interface ("GUI") enables a user to assist with the testing and evaluating.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for implementing intelligent automation of opportunity transaction workflows by a processor, comprising:

receiving data representative of product information and historical transaction opportunity data relating to one or more transaction opportunities for an entity;

training, in a machine learning operation, a classifier to identify those of a plurality of tasks associated with a workflow of the one or more transaction opportunities suitable for automation, wherein the training of the classifier includes performing a pattern mining operation on the data to extract sequence patterns of performed tasks to learn and classify those of the plurality of tasks capable of being automated, and wherein the learning and classifying those of the plurality of tasks capable of being automated includes assigning a confidence score to each of a plurality of sub-tasks of each of the plurality of tasks, the confidence score representative of a plurality of features indicative of whether each of the plurality of sub-tasks is capable of automation;

automating, in a current transaction opportunity workflow, those of the plurality of tasks identified in an existing transaction opportunity workflow suitable for automation;

monitoring the plurality of tasks automated in the current transaction opportunity workflow, inclusive of monitoring a win probability of the one or more transaction opportunities based on a performance of the plurality of tasks automated in the current transaction opportunity workflow, wherein the monitoring generates feedback data utilized to iteratively enhance accuracy of the machine learning operation;

identifying one or more anomalies during execution of the plurality of tasks automated in the current transaction opportunity workflow, wherein the identifying of the one or more anomalies includes determining those of the plurality of sub-tasks which require human action to complete and are incapable of being automated, and wherein the identifying of the one or more anomalies includes detecting a decrease in the win probability based on the performance of the plurality of tasks; and triggering a notification upon identification of the one or more anomalies describing the human action requisite to perform those of the plurality of sub-tasks, wherein subsequent to identifying the human action is complete, automation of executing a remainder of the plurality of sub-tasks of those of the plurality of tasks in the current transaction opportunity workflow is recommenced.

2. The method of claim 1, wherein learning and classifying those of the plurality of tasks capable of being automated for the current transaction opportunity workflow includes determining those of the plurality of tasks in an identified transaction opportunity.

3. The method of claim 1, further including automatically replicating those of the plurality of tasks in the current transaction opportunity workflow.

4. The method of claim 1, further including scheduling and executing those of the plurality of tasks automated in the current transaction opportunity workflow.

5. The method of claim 1, further including testing and evaluating performance of those of the plurality of tasks automated in the current transaction opportunity workflow, wherein an interactive graphical user interface ("GUI") enables a user to assist with testing and evaluating.

6. A system for intelligent automation of opportunity transaction workflows, comprising:
one or more computers with executable instructions that when executed cause the system to:
receive data representative of product information and historical transaction opportunity data relating to one or more transaction opportunities for an entity;
train, in a machine learning operation, a classifier to identify those of a plurality of tasks associated with a workflow of the one or more transaction opportunities suitable for automation, wherein the training of the classifier includes performing a pattern mining operation on the data to extract sequence patterns of performed tasks to learn and classify those of the plurality of tasks capable of being automated, and wherein the learning and classifying those of the plurality of tasks capable of being automated includes assigning a confidence score to each of a plurality of sub-tasks of each of the plurality of tasks, the confidence score representative of a plurality of features indicative of whether each of the plurality of sub-tasks is capable of automation;
automate, in a current transaction opportunity workflow, those of the plurality of tasks identified in an existing transaction opportunity workflow suitable for automation;
monitor the plurality of tasks automated in the current transaction opportunity workflow, inclusive of monitoring a win probability of the one or more transaction opportunities based on a performance of the plurality of tasks automated in the current transaction opportunity workflow, wherein the monitoring generates feedback data utilized to iteratively enhance accuracy of the machine learning operation;
identify one or more anomalies during execution of the plurality of tasks automated in the current transaction opportunity workflow, wherein the identifying of the one or more anomalies includes determining those of the plurality of sub-tasks which require human action to complete and are incapable of being automated, and wherein the identifying of the one or more anomalies includes detecting a decrease in the win probability based on the performance of the plurality of tasks; and
trigger a notification upon identification of the one or more anomalies describing the human action requisite to perform those of the plurality of sub-tasks, wherein subsequent to identifying the human action is complete, automation of executing a remainder of the plurality of sub-tasks of those of the plurality of tasks in the current transaction opportunity workflow is recommenced.

7. The system of claim 6, wherein learning and classifying those of the plurality of tasks capable of being automated for the current transaction opportunity workflow includes determining those of the plurality of tasks in an identified transaction opportunity.

8. The system of claim 6, wherein the executable instructions automatically replicate those of the plurality of tasks in the current transaction opportunity workflow.

9. The system of claim 6, wherein the executable instructions schedule and execute those of the plurality of tasks automated in the current transaction opportunity workflow.

10. The system of claim 6, wherein the executable instructions test and evaluate performance of those of the plurality of tasks automated in the current transaction opportunity workflow, wherein an interactive graphical user interface ("GUI") enables a user to assist with testing and evaluating.

11. A computer program product for intelligent automation of opportunity transaction workflows by a processor, the computer program product comprising a non-transitory computer-readable storage medium having computer-readable program code portions stored therein, the computer-readable program code portions comprising:
an executable portion that receives data representative of product information and historical transaction opportunity data relating to one or more transaction opportunities for an entity;
an executable portion that trains, in a machine learning operation, a classifier to identify those of a plurality of tasks associated with a workflow of the one or more transaction opportunities suitable for automation, wherein the training of the classifier includes performing a pattern mining operation on the data to extract sequence patterns of performed tasks to learn and classify those of the plurality of tasks capable of being automated, and wherein the learning and classifying those of the plurality of tasks capable of being automated includes assigning a confidence score to each of a plurality of sub-tasks of each of the plurality of tasks, the confidence score representative of a plurality of features indicative of whether each of the plurality of sub-tasks is capable of automation;
an executable portion that automates, in a current transaction opportunity workflow, those of the plurality of tasks identified in an existing transaction opportunity workflow suitable for automation;
an executable portion that monitors the plurality of tasks automated in the current transaction opportunity workflow, inclusive of monitoring a win probability of the one or more transaction opportunities based on a performance of the plurality of tasks automated in the current transaction opportunity workflow, wherein the monitoring generates feedback data utilized to iteratively enhance accuracy of the machine learning operation;
an executable portion that identifies one or more anomalies during execution of the plurality of tasks automated in the current transaction opportunity workflow, wherein the identifying of the one or more anomalies includes determining those of the plurality of sub-tasks which require human action to complete and are incapable of being automated, and wherein the identifying of the one or more anomalies includes detecting a decrease in the win probability based on the performance of the plurality of tasks; and an executable portion that triggers a notification upon identification of the one or more anomalies describing the human action requisite to perform those of the plurality of sub-tasks, wherein subsequent to identifying the human action is complete, automation of executing a remainder of the plurality of sub-tasks of those of the plurality of tasks in the current transaction opportunity workflow is recommenced.

12. The computer program product of claim 11, wherein learning and classifying those of the plurality of tasks capable of being automated for the current transaction opportunity workflow includes determining those of the plurality of tasks in an identified transaction opportunity.

13. The computer program product of claim 11, further including an executable portion that automatically replicates those of the plurality of tasks in the current transaction opportunity workflow.

14. The computer program product of claim 11, further including an executable portion that schedules and executes those of the plurality of tasks automated in the current transaction opportunity workflow.

15. The computer program product of claim 11, further including an executable portion that tests and evaluates performance of those of the plurality of tasks automated in the current transaction opportunity workflow, wherein an interactive graphical user interface ("GUI") enables a user to assist with testing and evaluating.

* * * * *